Patented June 13, 1950

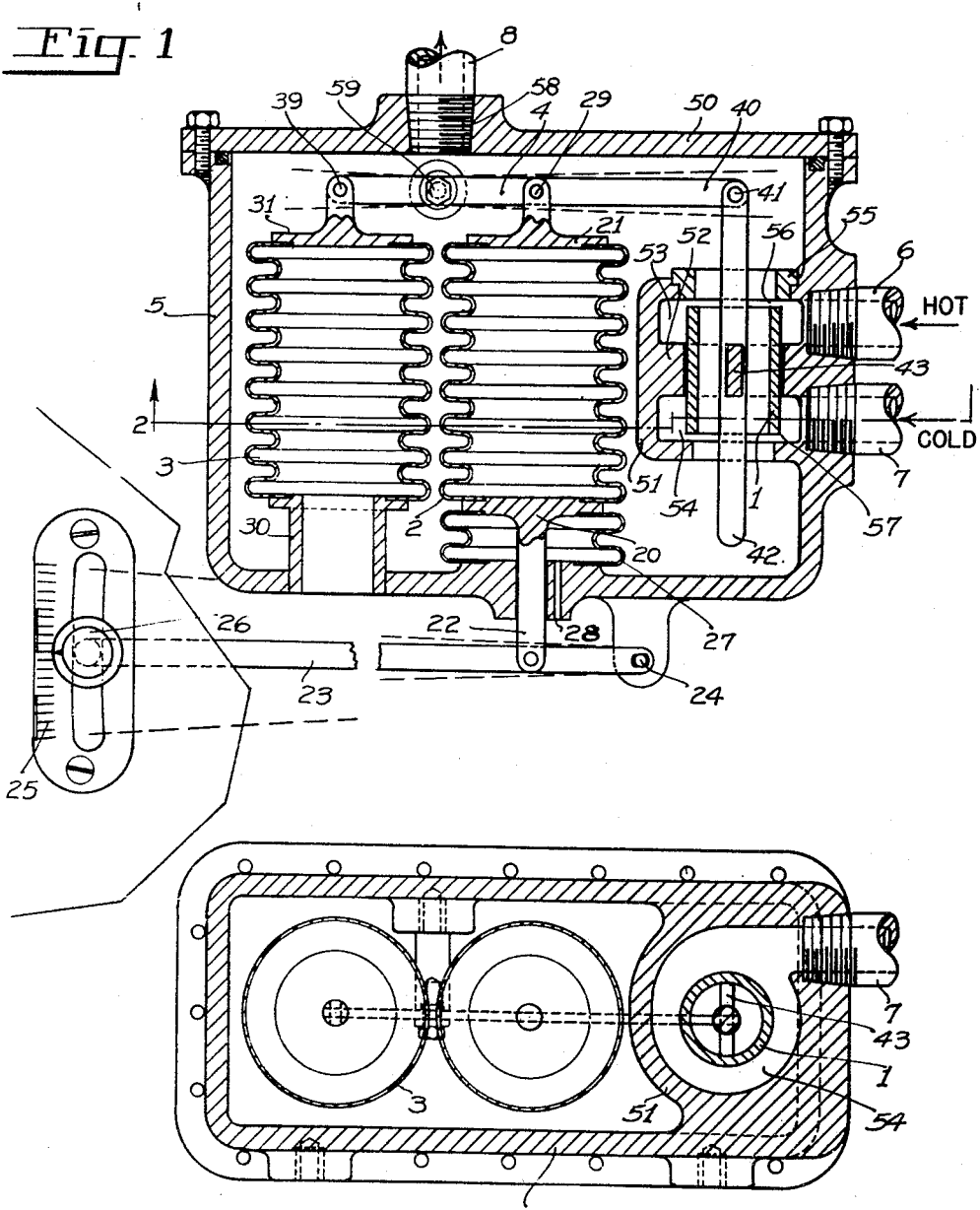

2,511,094

UNITED STATES PATENT OFFICE 2,511,094

PRESSURE-COMPENSATED MIXING VALVE

Walter H. Barkas, Seattle, Wash.

Application February 12, 1946, Serial No. 647,110

3 Claims. (Cl. 236—12)

Mixing valves, whereby hot and cold water (for example) are mixed in such ratio as to maintain the outflowing water at a predetermined temperature, have employed a simple, inexpensive, closed bellows filled with a thermo-sensitive fluid as the means to regulate the ratio of hot to cold inflowing water. Such regulating means, located within the mixing chamber can be made to function quite satisfactorily and sensitively to regulate water temperature, but have been subject to the objection, among others, that they are also pressure-sensitive. Each must be individually set to correspond to pressure conditions present in the particular installation; once set, a change in existing pressure conditions produces a change in the temperature of the outflowing water; fluctuating changes during delivery, such as may occur when water is simultaneously drawn from another tap in the system, cannot be compensated for. In a word, due to factors unrelated to temperature, such mixing valves, though quite sensitive to temperature changes, cannot maintain a constant outflow temperature. The net result is, that notwithstanding the recognized advantages of such controls, the disadvantages are so great that bellows controls are not widely used; instead, mixing valves in use employ more expensive and complicated bimetallic thermo-sensitive elements.

The primary object of the present invention is to provide a mixing valve so constructed and arranged that pressure changes can be automatically neutralized, as rapidly and to whatever extent they may occur, to the end that the thermo-sensitive control shall be subject only to thermal changes.

More especially is it an object to provide means for such pressure-change neutralization which is applicable to a bellows-type thermo-sensitive element in such a mixing valve, so that the advantages of that type of thermal control may be realized—such as cheapness, simplicity, availability, compactness, and sensitivity within any desired range—without the usually-accompanying disadvantages thereof.

It is a secondary object, made possible by the use of the bellows-type thermo-sensitive element and of the particular pressure-neutralizing element employed, to employ a simple, balanced valve and simple mechanical connections between the same and the respective control elements.

Another object is to provide a mixing valve which is so designed and arranged that it may readily be incorporated within a wall of any normal construction, and concealed behind tiling or any usual wall finish, and a valve, moreover, which to a minimum degree is affected by its orientation in such an installation.

Still another object is to provide a mixing valve of the general character indicated, in which the parts are so arranged that, in the event of leakage, the valve will automatically cut off the supply of hot water, thereby avoiding any possibility of scalding the user, if, for example, the mixing valve is supplying water to a shower head.

A further object is to provide a mixing valve of such design that it is simple and inexpensive to manufacture and assemble.

Other objects will appear as this specification progresses, or can readily be ascertained from the drawings or claims, and need not be listed here in detail.

The invention comprises the novel parts, and more especially the novel combination and arrangement of the parts, in the manner and to the ends herein set forth, and as more particularly defined in the appended claims. It will be understood that the drawings illustrate a representative form of the invention, and a form which is presently the preferred form, but that the invention may assume other forms embodying the principles therein illustrated and herein explained and defined. The drawings, and this specification, are to be understood as explanatory rather than as restrictive, and no restriction is intended other than as indicated in the claims.

Figure 1 is a sectional view, generally along the axes of the valve and the control elements.

Figure 2 is a transverse section, substantially along the line 2—2 of Figure 1.

The valve casing 5 is formed of somewhat flattened rectangular shape, for incorporation within a wall, and is closed at what may be considered its top by a cover 50. Internally a boss 51 is chambered, by a central partition 52, to provide a hot water inlet chamber 53 and a cold water inlet chamber 54 to which lead the respective hot and cold water supply pipes 6 and 7. The latter are preferably tangentially arranged with respect to their chambers, as is shown in Figure 2, so that the valve's movement is not impeded by any effect of impact.

The central partition 52 is bored to form a sliding guide for a valve body 1. Preferably the valve body is a sleeve, open from end to end, seating or tending to seat at its opposite ends upon valve seats formed in the outer walls of the respective chambers 53 and 54; such seat, in one instance is provided by the inserted collar 55 which retains the valve body after its assembly.

As the valve body moves upwardly it restricts the hot water inlet 56 leading from the hot water chamber 53, and correspondingly opens the cold water inlet 57; as the valve body moves downwardly the reverse action occurs. By reason of the sleeve-like character of the valve body there is no restriction of communication, nor difference of pressure, as between its opposite ends, nor is there any impediment, other than possibly friction, to its movement under the influence of its controls. Indeed, its guide within the bore of the partition 52 need not be close-fitting, as presumably there will be no particularly greater tendency for hot water to flow from chamber 53 to chamber 54 than for flow in the opposite direction, and the valve body 1 is intended only to regulate mixing, other cut-off valves (not shown) being provided, as is customary.

The arrangement of the boss 51 and of its stepped and aligned bores lends itself admirably to simple and inexpensive manufacturing and assembling operations. In one setting, and in fact with a single tool and in a single operation, all bores can be accurately finished, and the valve is easily inserted and retained by insertion of the collar 55.

The casing 5 has an outlet 58 leading by way of pipe 8 to the shower head or other discharge device, which has not been illustrated. The outlet 58 should be sufficiently spaced from the respective inlets 56, 57 that the water will mix thoroughly before passing through the outlet, and so that the temperature which affects the thermo-sensitive element 2 is the temperature of the mixture rather than the temperature of water entering at either inlet 56 or 57.

The thermo-sensitive element 2, installed within the casing 5 and subject to the temperature of the hot and cold water mixture flowing therethrough, is preferably of the closed bellows type, and contains a fluid which is thermo-sensitive, particularly so within the desired control range. While many suitable fluids are known, the bellows 2 may contain, for example, ethyl ether, which is of rapidly changing vapor tension between the temperatures 45° F. and 120° F. which may be assumed to be the extreme limits of permissible variation for domestic shower bath supply. For other purposes, other suitable fluids may be chosen. The quantity employed is such, having regard to the mechanical hook-up and extent of control movement required, as will give the desired results. Such matters are a matter of design according to known principles, and need not be set forth in greater detail, and indeed cannot be so set forth without—unnecessarily—defining the precise conditions surrounding some particular design.

In effect one end 20 of the thermo-sensitive bellows 2 is fixed relative to the casing 5, and its opposite end 21, of given area, is movable with respect to the casing. Actually, in order to vary the mean or equilibrium temperature which it is desired to maintain, the end 20 is adjustable by means of the stem 22 and regulating arm 23, fulcrumed exteriorly of the casing at 24, and held in adjusted position relative to a wall-supported scale 25 by a clamp screw or the like at 26. The stem 22 is shielded from the fluid within casing 5 by the resilient bellows extension 27, to seal the aperture in the casing through which the stem extends, and the interior of such bellows is vented to the atmosphere by a bleed port 28. Alternatively the stem may be packed in conventional fashion to seal the stem aperture.

The movable head 21 of the thermo-sensitive bellows 2 is pivotally connected at 29 to a control arm 4 fulcrumed at 59 within the casing, and extended at 40 generally into alignment with the valve body 1. A rod 42, disposed axially of the valve body and connected thereto by the cross bar 43, is pivoted at 41 to the control arm extension 40.

While it incorporates certain improvements and advantages, such an arrangement, without more, is representative of the normal arrangement of a bellows control with a mixing valve. Should the temperature of the water mixture increase, the bellows 2 would expand, and consequent movement of the arm 4 and valve 1 would tend to decrease the size of the hot water inlet 56 and correspondingly to increase the size of the cold water inlet 57, with the result that the temperature of the mixture would decrease. The opposite occurs upon a tendency for the mixture to decrease in temperature. Substantial uniformity of temperature of the outflowing water can be maintained automatically.

However, this result occurs only so long as the pressure remains constant within the casing. Should the pressure therein increase, it is effective upon the area of the head 21 to compress the bellows 2, resulting in increase of the ratio of hot water to cold water, purely as an effect flowing from pressure change, not thermal change. The thermo-sensitive characteristics of the also pressure-sensitive bellows attempt to restore equilibrium, but very perceptible and annoying, and sometimes dangerous, fluctuations of temperature occur. Similar results follow decrease of pressure.

To neutralize such pressure-induced effects, without disturbing the thermally-induced effects, according to the present invention there is installed within the casing a similar bellows 3, so arranged that it is only (or predominantly) pressure-sensitive, and connected in such manner that its effect is opposed to and substantially neutralizes the pressure-induced effect of the bellows 2.

The bellows 3 has a movable head 31 of area similar to the area of head 21, exposed to the same pressure existing within the casing. Its opposite end rests upon a tube 30, of sufficient area that no substantial area of the bellows' lower head is exposed to water pressure, and by means of which the entire interior of the bellows 3, including the under side of its head 31, is exposed to atmospheric pressure. Atmospheric pressure, though variable over protracted periods, may be taken as stable at any given instant, relative to fluctuating water pressure. Alternatively bellows 3 may be evacuated, in which event no variation in its internal pressure would occur. In such case its resilience might be augmented by an internal compression spring, if desired.

The bellows 3 might be, for example, axially aligned with the bellows 2, and hence disposed at the same side of the fulcrum 59 but at the opposite side of the arm 4, to directly oppose the bellows 2. However, it is preferred to arrange the two bellows side by side, parallel to each other and to the axis of the valve body 1, and all in a common general plane. Accordingly, the bellows 3 is at the opposite side of the fulcrum 59 from the bellows 2, and its head 31 is pivotally connected at 39 to the arm 4 at a distance from the fulcrum 59 which preferably is equal to the spacing therefrom of the pivot connection 29. Naturally, for precise neutralization the simplest way is to make the heads 21 and 31 of equal area, and their leverage connections to the control arm 4 also equal. The same or similar results can be obtained, or if precise neutralization is not desired then the desired result can be obtained, by proper choice and design of the respective heads and lever arms.

In this connection, it may be pointed out in passing that, obviously, the mean or equilibrium temperature to be maintained can be varied by adjusting the position of the lower end of either bellows 2 or bellows 3, or by the application of a force to the lever 4 at any location on either side of pivot 59, not necessarily or solely by the already described adjustment of the head 20.

Now it can be seen that, if increase of pressure within the casing tends to compress the bellows 2, by its effect upon the head 21, such increase of pressure equally tends to compress the bellows 3, acting upon its head 31. The areas and linkages being properly chosen, the one pressure-induced effect offsets and neutralizes the other, regardless of the absolute value or frequency of the pressure change, and whether it is positive or negative. This behavior results from the fact that the inlets 56 and 57 and the outlet 58 are so located relative to the bellows 2 and 3 that the action of the fluid pressure on the effective area of the bellows 2 is always compensated by the action of an equal fluid pressure on the effective area of bellows 3, irrespective of the rate of fluid flow. For example, when the outlet 58 is located relatively distant from the inlets 56 and 57 and relatively close to the bellows 2 and 3, as in the embodiment illustrated, the pressures on the effective areas of both bellows are substantially controlled by the location of the outlet 58. Further, if the bellows are of equal effective areas, as shown in the embodiment in the drawing, and the (nearby) outlet 58 is located as shown in a plane symmetrically placed relative to the centers of these areas, the dynamic component of the pressure acts equally on the areas. Although, the effects of pressure on the two bellows are neutralized, still, thermally-induced changes will take full effect upon the bellows 2, which alone is materially thermo-sensitive, and corresponding valve movement occurs, quite without disturbance from pressure-change effects. It should be noted that since the bellows 2 is located in the path of flow of both the hot and cold fluids from their respective inlets to the outlet 58, the bellows 2 will be affected by both fluids and its response will be indicative of the temperature of the mixed fluids approaching the outlet 58.

The two bellows are in a sense mechanically resilient springs, but since they are arranged in mechanical opposition, this characteristic will not affect their operation as described above. Also, being normally made of metal, each will be thermally affected by, and will tend to elongate or shorten with temperature changes, but this is a minor effect as compared to the thermal sensitivity of the bellows 2 which arises from its contained fluid, and in any event the two bellows are arranged in opposition, so that this minor thermal effect is cancelled out between the two. Such opposition of the two bellows is of such value, normally, that the weight of the valve body 1 is a minor factor, and, in fact, the weight of the parts of the lever system may be accurately counterbalanced about the pivot 59. Hence the valve as a whole may be oriented in any convenient way without affecting its operation.

It will be clear that, if leakage occurs in the bellows 2, the system pressure will shortly prevail therein, and will tend to close off the inlet 56 to prevent scalding. Likewise, if leakage occurs in the bellows 3, either the operation thereof will be unaffected, or if the leak is large, hot water will escape therethrough, and scalding by way of the outlet 58 will be avoided. Leakage into the protective closure 27 will either act the same as leakage into the bellows 3, or will tend to displace the bellows 2 upwardly, closing off the hot water inlet 56.

The result is a mixing valve suitable for controlling and delivering a mixture of two fluids—not necessarily water—at a substantially unvarying equilibrium or mean temperature, quite independently of variations of pressure within the system, and having the several advantages and capabilities hereinabove outlined. Such temperature variations may, for example, be not over 1° F.

I claim as my invention:

1. A mixing device of the character described comprising a casing having a hot fluid inlet, a cold fluid inlet, and a fluid outlet; a piston type valve in said casing for increasing the opening of said hot fluid inlet in ratio to decreasing the opening of said cold fluid inlet and vice versa; means conducting the flow of fluids from said inlets to approach said valve generally tangentially adjacent opposite ends thereof whereby binding of said valve due to fluid pressure is substantially eliminated; a valve rod attached to said valve and extending into said casing beyond each end of said valve substantially equal amounts whereby unbalanced forces on said valve due to fluid pressure on said rod are substantially eliminated; a lever fulcrumed on said casing and linked to said valve rod for actuating said valve; a bellows sensitive both to temperature and to fluid pressure within said casing linked to said lever; and a second bellows sensitive substantially only to fluid pressure within said casing linked to said lever to oppose action of said first bellows; said inlets, outlet, and bellows being so constructed and arranged that the position of the outlet substantially controls the fluid pressure on the effective areas of said bellows and the outlet is located symmetrically relative to the centers of said areas generally in a plane equi-distant from said centers so that the pressure of the fluid is equal on the effective areas of each bellows, irrespective of the rate of flow of the fluid, whereby the influence of fluid pressure on the actuation of said valve is substantially eliminated; said temperature sensitive bellows being so disposed relative to the path of fluids traveling between said inlets and said outlets as to cause mixing of said fluids and to cause the response of said temperature sensitive bellows to be substantially indicative of the temperature of the mixed fluids leaving said casing via said outlet.

2. A mixing device of the character described comprising a casing having a cold fluid inlet, a hot fluid inlet, and a fluid outlet; a valve within said casing arranged to open said hot fluid inlet in ratio to closing said cold fluid inlet and vice versa; means for actuating said valve including a lever linked to said valve and fulcrumed on said casing, a bellows linked to said lever sensitive to fluid pressure and temperature, and a second bellows sensitive to pressure only linked to said lever to oppose the action of said temperature sensitive bellows; said outlet being relatively remote from said inlets and relatively near said bellows whereby the fluid pressure on the effective areas of said bellows is substantially controlled by the position of said outlet; said outlet being disposed symmetrically relative to the centers of said areas in a plane equidistant from said centers whereby the action of the fluid pressure is equal on said areas regardless of the rate of fluid flow so that the influence of fluid pressure within said casing on the actuation of said valve is substantially eliminated.

3. A mixing device of the character described comprising a casing having a cold fluid inlet, a hot fluid inlet, and a fluid outlet; a valve within said casing arranged to open said hot fluid inlet in ratio to closing said cold fluid inlet and vice versa; means for actuating said valve including a lever linked to said valve and fulcrumed on said casing, a bellows linked to said lever sensitive to fluid pressure and temperature, a second bellows linked to said lever and sensitive to pressure only; said fluid outlet being so located as to substantially control the pressure on the effective pressure sensitive areas of both said bellows and being disposed symmetrically relative to the centers of said areas in a plane equi-distant from said centers so that the action of the fluid pressure is equal on said areas regardless of the rate of fluid flow whereby the influence of fluid pressure within said casing on the actuation of said valve is substantially eliminated; and means for adjusting the setting of one end of said temperature sensitive bellows to control the temperature of fluid leaving said outlet comprising a regulating arm fulcrumed on said casing and linked to said end of said temperature sensitive bellows said regulating arm having an elongated portion describing upon operation of said arm substantially a multiple of the motion of said end of said temperature sensitive bellows whereby precision setting of said temperature sensitive bellows may be accomplished, and means for locking said regulating arm in any desired position of adjustment.

WALTER H. BARKAS.

REFERENCES CITED

The following references are of record in the file of this patent:

UNITED STATES PATENTS

| Number | Name | Date |
|---|---|---|
| Re. 19,488 | Russell | Mar. 5, 1935 |
| 907,771 | Fulton | Dec. 29, 1908 |
| 1,208,130 | Fulton | Dec. 12, 1916 |
| 1,223,079 | Lammert | Apr. 17, 1917 |
| 1,289,435 | Fulton | Dec. 31, 1918 |
| 1,517,598 | Stevenson | Dec. 2, 1924 |
| 2,317,717 | Bauman | Apr. 27, 1943 |

FOREIGN PATENTS

| Number | Country | Date |
|---|---|---|
| 234,563 | Great Britain | June 4, 1925 |